(12) United States Patent
Fedorov

(10) Patent No.: US 11,294,200 B2
(45) Date of Patent: Apr. 5, 2022

(54) DEVICE FOR PROTECTING USER'S NOSE FROM SOLAR RADIATION

(71) Applicant: InnoTech International, LLC, Wilmington, DE (US)

(72) Inventor: Gennadi Fedorov, Brandon, FL (US)

(73) Assignee: Innotec International, LLC, Wilmington, DE (US)

( * ) Notice: Subject to any disclaimer, the term of this patent is extended or adjusted under 35 U.S.C. 154(b) by 272 days.

(21) Appl. No.: 16/593,625

(22) Filed: Oct. 4, 2019

(65) Prior Publication Data
US 2020/0400969 A1    Dec. 24, 2020

Related U.S. Application Data

(60) Provisional application No. 62/865,147, filed on Jun. 22, 2019.

(51) Int. Cl.
*G02C 5/12* (2006.01)
*A41D 13/11* (2006.01)
*G02C 5/00* (2006.01)

(52) U.S. Cl.
CPC .......... *G02C 5/122* (2013.01); *A41D 13/1107* (2013.01); *G02C 5/001* (2013.01); *A41D 2400/26* (2013.01)

(58) Field of Classification Search
CPC .......... G02C 5/122; G02C 5/001; G02C 5/12; G02C 11/00; A41D 13/1107; A41D 2400/26
See application file for complete search history.

(56) References Cited

U.S. PATENT DOCUMENTS

| | | | | |
|---|---|---|---|---|
| 2,037,772 A | * | 4/1936 | Everett | G02C 5/12 2/12 |
| 4,786,159 A | * | 11/1988 | Piazza, Sr. | G02C 5/12 351/132 |
| 5,167,036 A | * | 12/1992 | Daprato | G02C 5/12 2/13 |
| 5,416,923 A | * | 5/1995 | Peugh | A61F 9/029 2/206 |
| 5,717,992 A | * | 2/1998 | Tilghman | A61F 9/029 2/206 |
| 10,948,741 B2 | * | 3/2021 | Chou | A61F 9/029 |
| 2012/0036608 A1 | * | 2/2012 | Beliveau | A61F 9/029 2/9 |

* cited by examiner

*Primary Examiner* — Tuyen Tra
(74) *Attorney, Agent, or Firm* — Henry M. Feierseisen LLC

(57) ABSTRACT

A device for protecting a user's nose from solar radiation has a cover part which is formed to cover a user's nose and is composed of a material which is capable of protecting a user's nose from solar radiation, and a connecting part which is attachable to glasses or sunglasses wearable by a user and formed to be retained on the glasses and holds the cover part of the device on the user's nose.

12 Claims, 7 Drawing Sheets

DEVICE FOR PROTECTING USER'S NOSE FROM SOLAR RADIATION

BACKGROUND OF THE INVENTION

The present invention relates to devices for protecting a user's nose from solar radiation, in particular for protecting a nose skin from harmless UV sun rays of the solar radiation and thereby reducing risks of skin cancer.

Products for protecting a user's nose from solar radiation are known in great varieties. They vary from full-head and face covers caps covering a user's nose to cremes and lotions topically applied on a user's nose.

It is believed that the existing devices and products for protecting a user's nose from solar radiation can be further improved in an advantageous manner.

SUMMARY OF THE INVENTION

It is therefore an object of the present invention to provide a device for protecting a user's nose from solar radiation, which is a further improvement of existing devices.

In keeping with these objects and with others which will become apparent hereinafter, one feature of the present invention resides, briefly stated, in a device for protecting a user's nose from solar radiation, which has a cover part which is formed to cover a user's nose and is composed of a material which is capable of protecting a user's nose from solar radiation, and a connecting part which is attachable to glasses or sunglasses wearable by a user and formed to be retained on the glasses and hold the cover part of the device on the users nose.

When the device for protecting a users nose from solar radiation is designed according to the present invention, it is attachable to the glasses or sunglasses, it comes in close contact with a user's nose skin, and it effectively blocks UV sunrays from being absorbed by the user's skin.

According to another novel feature of the present invention the connecting part of the device for protecting a user's nose from solar radiation is formed of one piece with the cover part.

According to a further novel feature of the present invention the connecting part of the device for protecting a user's nose from solar radiation is formed as a separate part provided with means for connecting the connecting part with the cover part.

According to a further novel feature of the present invention the cover part of the device for protecting a user's nose from solar radiation has an inner surface provided with a plurality of inwardly projecting elements which provide a spacing between the cover part and a surface of a user's nose, thus promoting an air circulation between the device and the surface of the user's nose.

According to a further novel feature of the present invention the cover part of the device for protecting a user's nose from solar radiation has a plurality of through going openings promoting a ventilation between the device and a surface of the user's nose.

According to a further novel feature of the present invention the cover part of the device for protecting a user's nose from solar radiation has a plurality of through going openings promoting a ventilation between the device and a surface of the user's nose, and a plurality of inwardly projecting elements which are located between the through going openings and provide a spacing between the cover part and a surface of a user's nose, thus further promoting an air circulation between the device and a surface of the user's nose.

According to a further novel feature of the present invention the cover part of the device for protecting a user nose from solar radiation includes a central part formed to cover an upper part of the users nose and two parts formed to cover sides parts of the user's nose and being of one piece with the central part.

According to another novel feature of the present invention the connecting part of the device for protecting a user nose from solar radiation is provided with magnetic means securing a connection of the cover part to the glasses.

According to a further novel feature of the present invention the cover part of the device for protecting a user nose from solar radiation has at least one recessed line for trimming the cover part to correspond to noses of smaller sizes.

According to a still further novel feature of the present invention the connecting part of the device for protecting a user nose from solar radiation is flexible and can stretch to be adapted to bridges of the glasses of different sizes.

The novel features of the present invention are set forth in the appended claims.

The invention itself however both as to its construction and its method of operation will be best understood from the following description of preferred embodiments, which is accompanied by the following drawings.

DETAILED DESCRIPTION OF PREFERRED EMBODIMENTS

Figure 1:
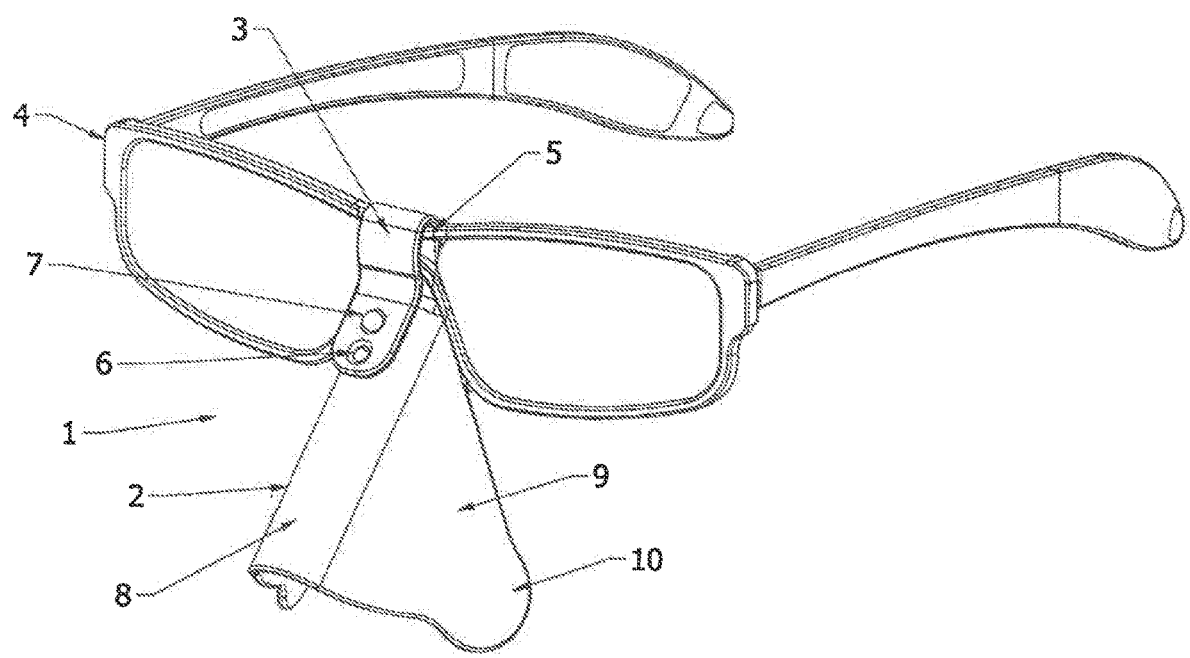
FIG. 1 of the drawings shows a perspective view of an inventive device protecting a user's nose from solar radiation has a cover part for covering a user's nose, and a connecting part attachable to glasses or sunglasses to hold the cover part on the user's nose.
Figure 2:
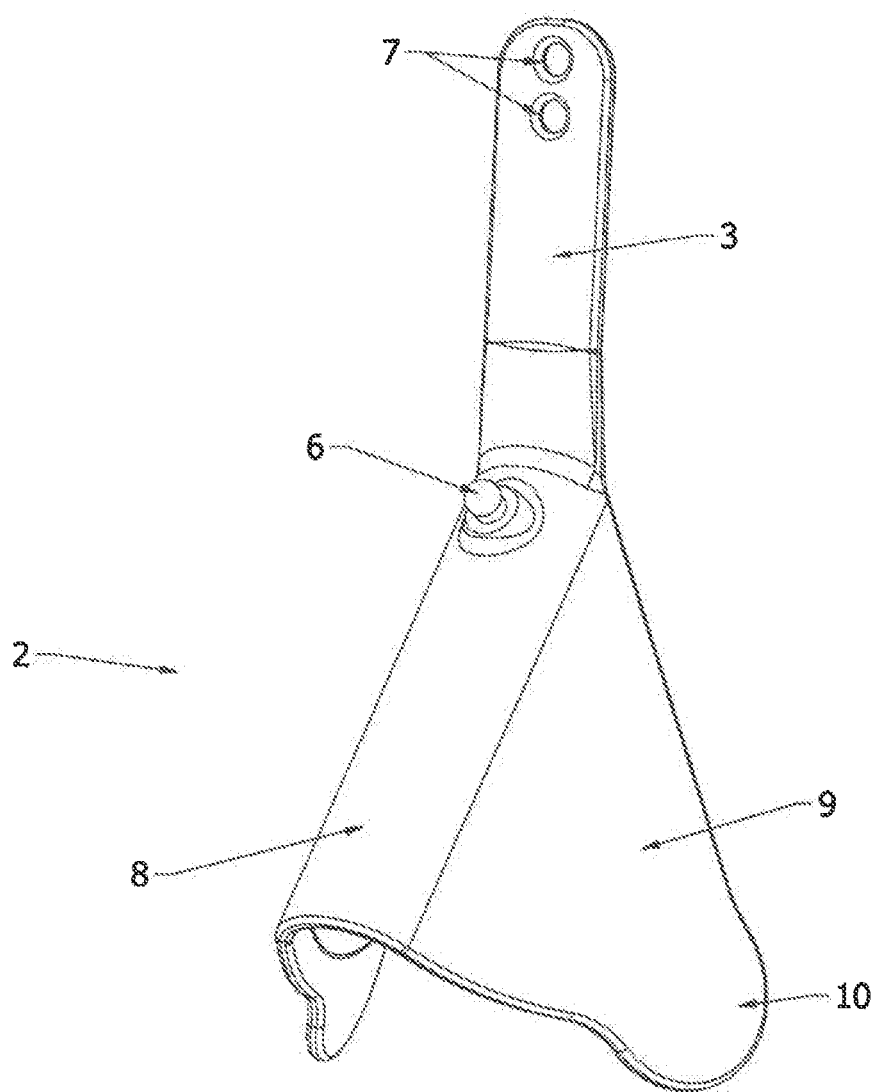
FIG. 2 of the drawings is a perspective view in the device for protecting a user's nose from solar radiation, provided with means securing a connection of the cover part for covering a user's nose, and an open connecting part to be attached to glasses to hold the cover part on the user's nose according to a first embodiments of the present invention.
Figure 3:
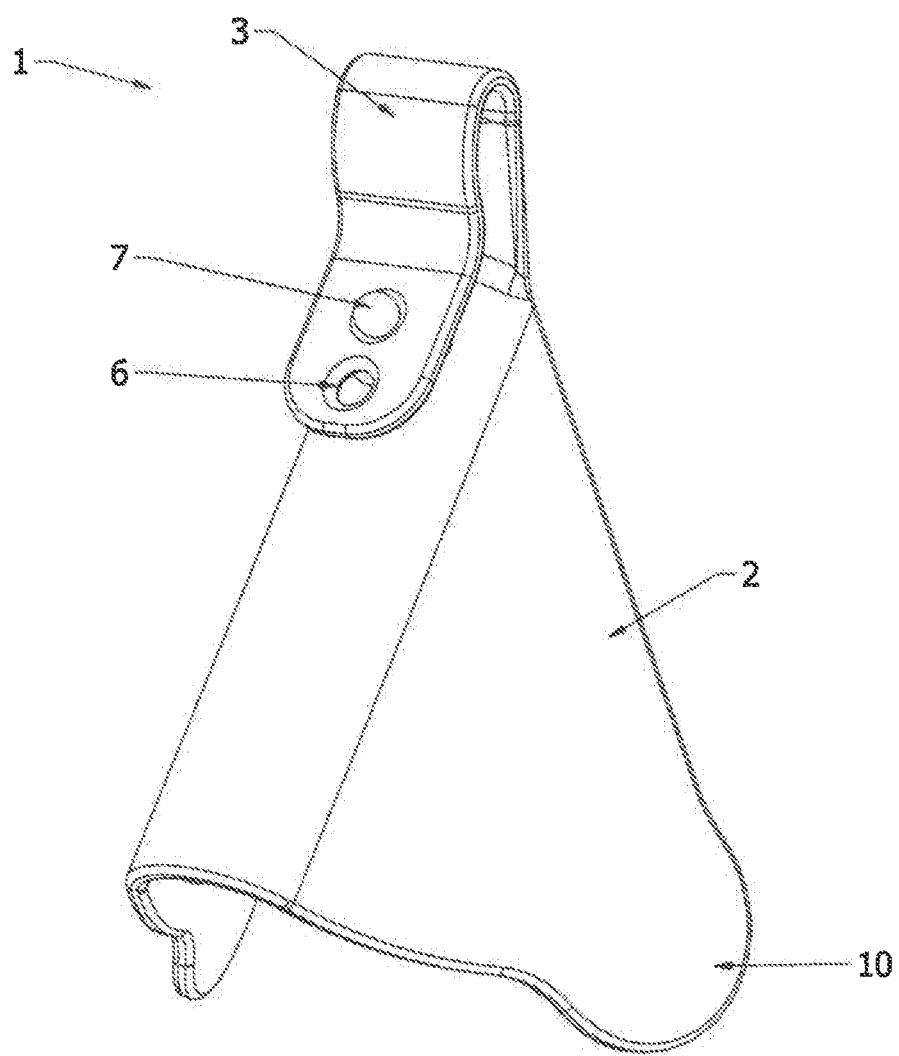
FIG. 3 of the drawings is a perspective view of the inventive device protecting a user nose from solar radiation, with a cover part for covering a user's nose, and a connecting part to be attached to glasses to hold the cover part on the user's nose and formed of one-piece with the cover part according to a first embodiments of the present invention.

FIGS. 1 and 2 show a device for protecting a user's nose from solar radiation, which is identified in general with reference numeral 1. It has a cover part 2 which is formed to cover a user's nose and is composed of a material which is capable of protecting a user's nose from solar radiation. The device 1 further has a connecting part 3 which is connected with the cover part 2 of one piece with the latter and is attachable to glasses or sunglasses 4. The connecting part 3 is formed to be retained on the glasses 4 and to hold the cover part 2 on the user's nose. In particular, it is formed as a flap which can be wrapped around a bridge 5 of the glasses 4.

The connecting part 3 has a locking pin 6 provided on the cover part 2 and at least one or several holes 7. The connecting part 3 therefore can be wrapped around the bridge 5 of the glasses or sunglasses 4 and its locking pin 6 can be lockingly introduced into one of the holes 7 in a corresponding adjusted position depending on the use of the particular hole 7, so as to firmly retain the device 1 of the present invention on the glasses 4.

The cover part 2 of the inventive device can be composed of any flexible or semi-flexible material, such as rubber, silicone, polypropylene or polyethylene resin. It can be shaped to have an upper portion 8 and two side portions 9 arrangeable over an upper surface of a user's nose and over its side surfaces, correspondingly.

As can be further seen from FIG. 1 of the drawings, the side portions of the cover part of the inventive device can be provided with corner extensions 10 offering better skin protection in the areas of nostrils of the nose of the user's face.

Further, the connecting part 2 of the device according to the present invention can be formed flexible and stretchable, so that the connecting part 2 of the inventive device can be placed around the bridge 5 of the glasses or sunglasses, which bridge can vary in its size within a substantially broad range, with stretching of the connecting part 2.

Figure 4:
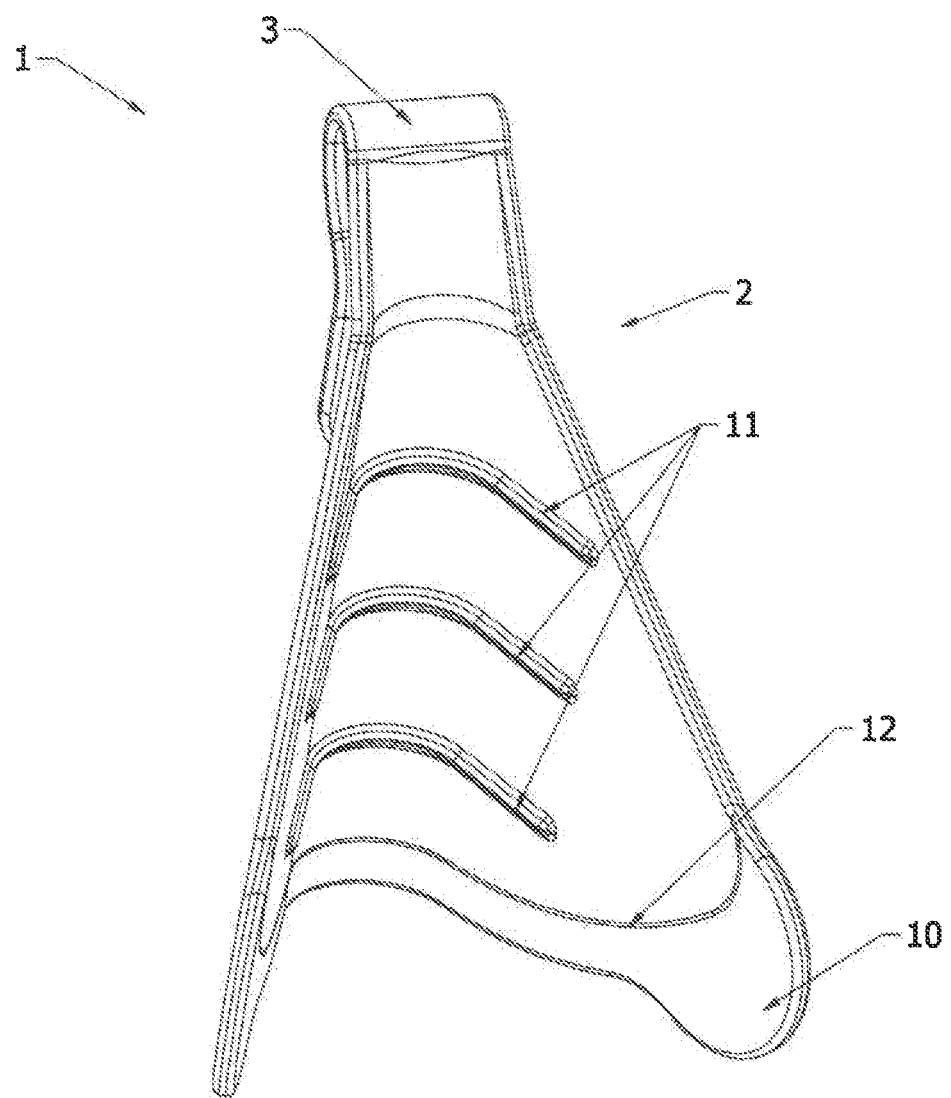
FIG. 4 of the drawings is a perspective view of the inventive device protecting a user nose from solar radiation, with a cover part for covering a user's nose, and a connecting part to be attached to glasses to hold the cover part on the user's nose according to a further embodiments of the present invention.

FIG. 4 shows an inventive device according to a further embodiment of the present invention. In this embodiment the cover part 2 of the inventive device is provided with projections 11 extending inwardly from the inner surface of the cover part 2 and across its inner surface. The projections 11 of the cover part 2 acts as spacers between the inner surface of the cover part 2 of the inventive device and a skin of a user, providing air ventilation and reducing sweating of a user.

As can be also seen from FIG. 4, the cover part 2 of the inventive device has at least one recess 12 indicating a cutting line. The cover part 2 can be thus trimmed along this cutting line for adjusting the length of the inventive device to smaller noses of its user.

Figure 5:
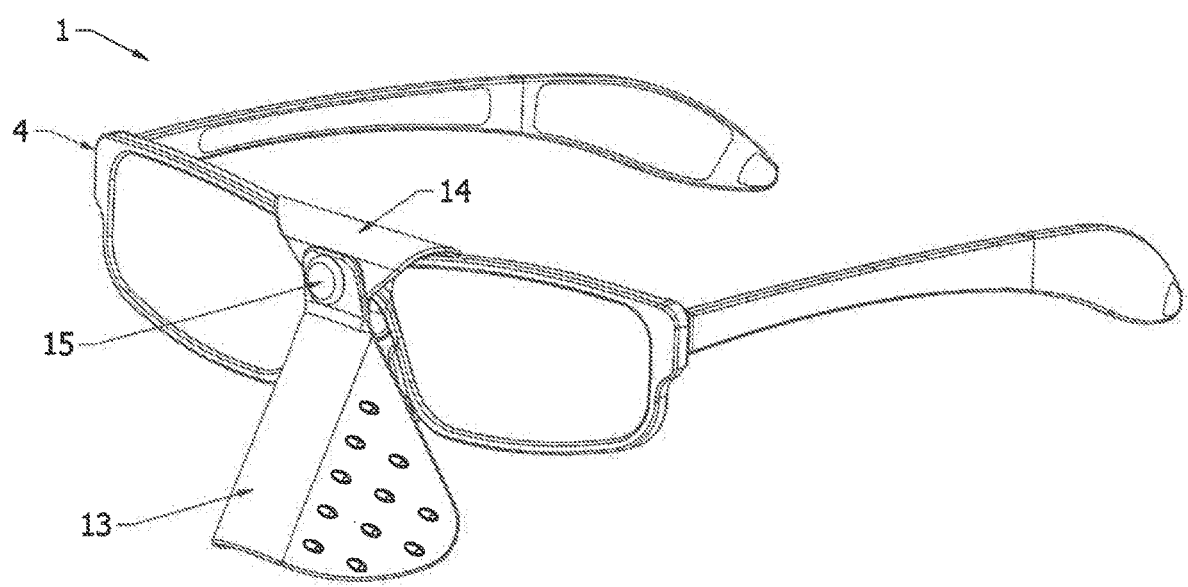
FIG. 5 of the drawings is a perspective view of the inventive device protecting a user nose from solar radiation, with a cover part for covering a user's nose, and a connecting part attached to glasses to hold the cover part on the user's nose and formed in accordance with still a further different embodiment of the present invention.

A further embodiment of the inventive device is shown in FIG. 5. The device according to this embodiment of the present invention has a cover part 13 and a separate connecting part 14 for connecting the cover part 13 to the bridge 5 of the glasses or the sunglasses 4. The cover part 13 has a magnetic button 15 on its upper short extension. The connecting part 14 is composed of a flexible and stretchable material allowing it to wrap around the bridge 5 of substantially any size and design.

Figure 6:
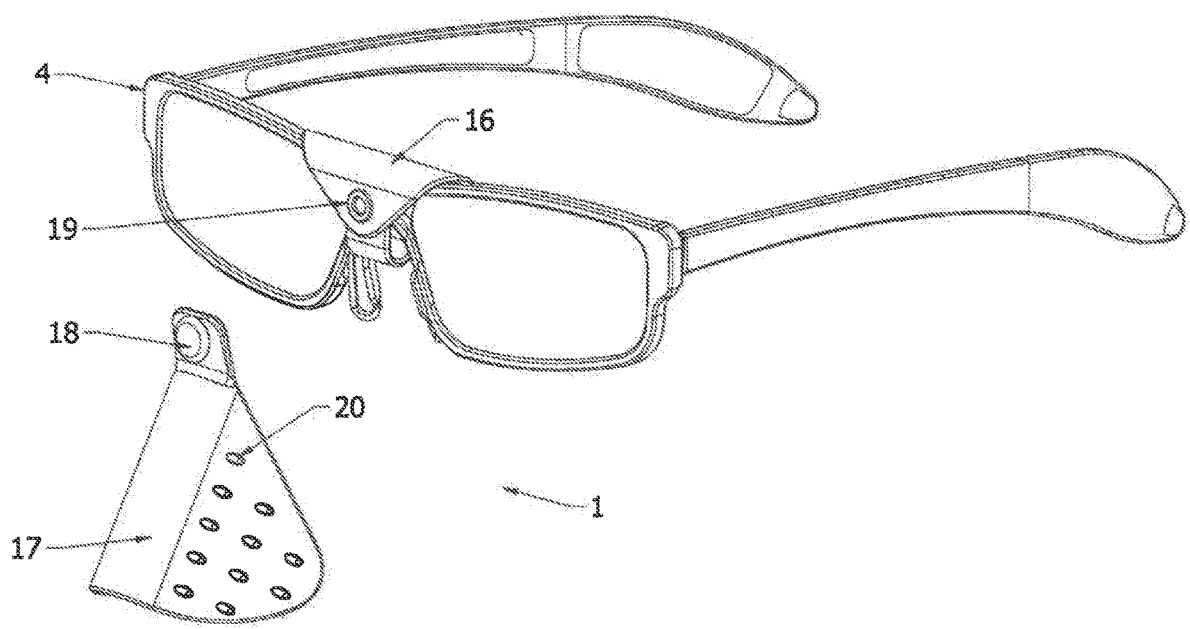
FIG. 6 of the drawings is a perspective view of the inventive device protecting a user nose from solar radiation, with a cover part for covering a user's nose, and a connecting part attached to glasses to hold the cover part on the user's nose and formed in accordance an additional different embodiment of the present invention.

In the device according to a further embodiment of the present invention shown in FIG. 6 the connecting part 16 of the device is formed as a separate part which is separate from the cover part 17 provided with means for connecting the connecting part 16 to the cover part 17. The cover part 17 is provided with a metal button 18 which can be snapped in a recess 19 of the connecting part 16.

Figure 8:
FIG. 8 of the drawings is a view showing a cross-section of a portion of the cover part, provided with through-going openings and with projections.

The cover part 17 has a plurality of ventilating openings 20 which are angled as shown in FIG. 8 so to minimize direct access of sunlight to a skin of the user's nose and therefore to minimize sweating of the user.

Figure 7:
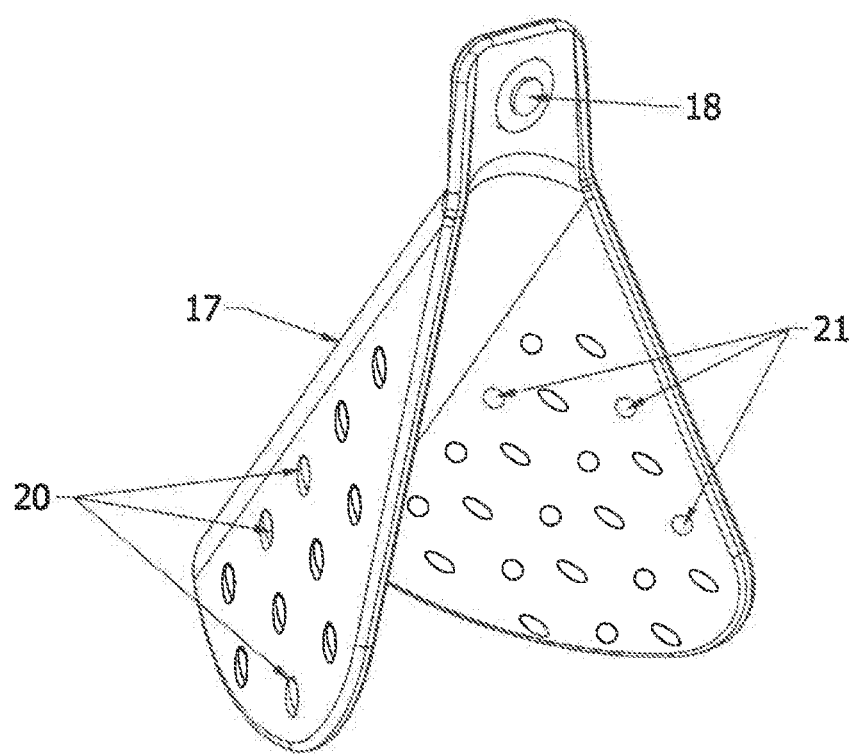
FIG. 7 of the drawings is a perspective view of a cover part for covering a user's nose of the inventive device protecting a user nose from solar radiation, in accordance with still an additional different embodiment of the present invention.

In the device according to a further embodiment of the present invention shown in FIG. 7 the cover part 17 has a magnetic button 18 in its upper part. The cover part 17 also has the ventilating openings 20 which are angled to minimize direct access of sunlight to a skin of the user's nose. The cover part 17 further has small, preferably semi-spherical projections 21 on the inner wall of the cover part to provide spacing between the inner surface of the cover part 17 and the user's skin. This further promotes air circulation under the cover part 17.

FIG. 8 shows a cross section of a wall of the cover part 17 which is provided both with the through going inclined ventilating openings 20 and the inwardly extending projections 21 located between them.

The novel features of the present invention are not limited to the details shown, since various modifications and structural changes are possible without departing from the basic ideas of the invention.

What is desired to be protected by Letters Patent is set forth in particular in the appended claims

What is claimed is:

1. A device for protecting a user's nose from solar radiation, comprising a cover part which is formed to cover a user's nose and is composed of a material which is capable of protecting a user's nose from solar radiation; and a connecting part which is attachable to glasses or sunglasses wearable by a user and formed to be retained on a bridge of the glasses and holds the cover part of the device on the user's nose, wherein the cover part has an inner surface provided with a plurality of inwardly projecting elements which form a spacing between the cover part and a surface of a user's nose, thus promoting an air circulation between the cover part and the surface of the user's nose.

2. A device for protecting a user's nose from solar radiation of claim 1, wherein the connecting part is formed of one piece with the cover part and of a same material.

3. A device for protecting a user's nose from solar radiation of claim 1, wherein the connecting part is formed as a separate part provided with means for connecting the connecting part with the cover part.

4. A device for protecting a user's nose from solar radiation of claim 1, wherein the cover part has a plurality of through going openings promoting a ventilation between the device and a surface of the user's nose.

5. A device for protecting a user's nose from solar radiation of claim 4, wherein the through-going openings are inclined to a surface of the cover part to minimize direct access of sunlight to a nose of a user.

6. A device for protecting a user's nose from solar radiation of claim 1, wherein the cover part has a central part formed to cover an upper surface of the user's nose and two parts formed to cover sides surfaces of the user's nose and being of one piece with the central part.

7. A device for protecting a user's nose from solar radiation of claim 1, wherein the connecting part is provided with magnetic means securing a connection of the cover part to the glasses or sunglasses.

8. A device for protecting a user's nose from solar radiation of claim 1, wherein the cover part has at least one recessed line for trimming the cover part to correspond to noses of smaller sizes.

9. A device for protecting a user's nose from solar radiation of claim 1, wherein the connecting part is adjustable to be adapted to be placed over the bridges of the glasses of different sizes.

10. A device for protecting a user's nose from solar radiation of claim 1, wherein the connecting part is formed so that when the cover part is placed on the surface of the user's nose the connecting part first extends between the user's nose and the bridge and then is turned over the bridge outwardly away from the user's nose and is attached to the cover part at an outer side of the cover part facing away from the user's nose.

11. A device for protecting a user's nose from solar radiation, comprising a cover part which is formed to cover a user's nose and is composed of a material which is capable of protecting a user's nose from solar radiation; and a connecting part which is attachable to glasses or sunglasses wearable by a user and formed to be retained on a bridge of the glasses and holds the cover part of the device on the user's nose, wherein the cover part has a plurality of inwardly projecting elements which provide a spacing between the cover part and a surface of a user's nose, thus promoting an aft circulation between the device and a surface of the user's nose.

12. A device for protecting a user's nose from solar radiation, comprising a cover part which is formed to cover a user's nose and is composed of a material which is capable of protecting a user's nose from solar radiation; and a connecting part which is attachable to glasses or sunglasses wearable by a user and formed to be retained on a bridge of the glasses and holds the cover part of the device on the user's nose, wherein the cover part has a plurality of through going openings promoting a ventilation between the device and a surface of the user's nose, and wherein the cover part has an inner surface provided with a plurality of inwardly projecting elements which form a spacing between the cover part and a surface of a user's nose, thus promoting an air circulation between the cover part and the surface of the user's nose, wherein said inwardly projecting element being distributed between said through-going openings.

* * * * *